the bight. An actuator or drive displaces the pin and table connected therewith along the path and the table is maintained parallel to the direction during travel of the pin along the path.

United States Patent [19]
Junklewitz

[11] Patent Number: 4,597,489
[45] Date of Patent: Jul. 1, 1986

[54] CONVEYOR FOR TRANSPORTING WHEEL RIMS DURING ROLL SHAPING

[75] Inventor: Hugo Junklewitz, Leichlingen, Fed. Rep. of Germany

[73] Assignee: Th. Kieserling & Albrecht GmbH. & Co., Solingen, Fed. Rep. of Germany

[21] Appl. No.: 679,900

[22] Filed: Dec. 10, 1984

[30] Foreign Application Priority Data

Dec. 10, 1983 [DE] Fed. Rep. of Germany ....... 3344797

[51] Int. Cl.[4] .............................................. B65G 25/00
[52] U.S. Cl. ............................. 198/468.2; 198/339.1; 414/225; 414/751
[58] Field of Search ............. 198/339.1, 468.01, 468.2, 198/773, 750, 739, 740, 743, 744, 468.4, 468.5; 414/225, 226, 750, 751, 749, 753, 222

[56] References Cited

U.S. PATENT DOCUMENTS 3,075,651  1/1963  Kaden ............................ 414/753 X
4,095,699  6/1978  O'Neil ......................... 198/468.2 X
4,306,401  12/1981  Stohlquist et al. ............. 198/740 X

FOREIGN PATENT DOCUMENTS 2628514  1/1977  Fed. Rep. of Germany ...... 414/749

Primary Examiner—Joseph E. Valenza
Assistant Examiner—Jonathan D. Holmes

[57] ABSTRACT

An apparatus transports a workpiece to be shaped into a wheel rim between a pair of similar rim-shaping machines having respective parallel working axes and each open to receive the workpiece only parallel to the respective axis. The apparatus has a table displaceable parallel to the axes and in a transport direction transverse thereto, at least two similar workpiece holders spaced apart in the transport direction on the table, and a guide pin projecting vertically from the table. A guide engages the pin and defines therefor a generally U-shaped transport path having two straight legs extending parallel to the axes, a straight bight extending parallel to the direction, and a pair of rounded corners connecting the respective legs to the bight. An actuator or drive displaces the pin and table connected therewith along the path and the table is maintained parallel to the direction during travel of the pin along the path.

8 Claims, 3 Drawing Figures

CONVEYOR FOR TRANSPORTING WHEEL RIMS DURING ROLL SHAPING

FIELD OF THE INVENTION

The present invention relates to the manufacture of vehicular wheel rims. More particularly this invention concerns a conveyor that transports a ring blank through the shaping steps that turn it into a wheel rim.

BACKGROUND OF THE INVENTION

A wheel rim is an annular metallic sleeve that is radially stepped in several locations so as to be generally outwardly U-shaped. A tire is engaged radially outside such a rim, with its beads against the confronting inside faces of the end flanges of the rim, and a center is attached inside the rim so it and the tire can be mounted on a wheel hub. Normally the center is a plate having a central hole that fits over the wheel hub and that is formed with an array of radially equispaced smaller holes surrounding the central hole and serving to bolt the center to the wheel hub. The outer edge of the plate is usually formed with bent-over tabs that are welded centrally to the inner periphery of the rim.

The rim is formed from a piece of rectangular steel strip that is first bent into a cylindrical shape and welded permanently together so as to form a so-called ring blank. The desired profile is imparted to this blank by rolling it between complementarily shaped rollers that appropriately deform the blank as they rotate and orbit it through them. Since the necessary profiling is relatively deep it is necessary to do it normally in two separate stages in the first of which an intermediate profile is formed and in the second of which the final profile is imparted to the workpiece.

The roll-shaping machines each have a inner roll which is outwardly grooved and of the same profile as that which is to be imparted to the workpiece in the respective station and an outer roll that has a positive version of this profile. The blank or partly shaped workpiece is fitted axially over the inner roll and the rolls are moved radially together and simultaneously rotated so as to roll the desired profiled into the workpiece.

In order to spread out roll wear it is necessary to make them as big and thereby increase the time between changes. In addition since the rolls are mounted only at one end, so that the workpiece can be slipped over one of them, a larger diameter makes the roll stiffer and easier to support solidly. Thus the inner roll is normally made of a maximum diameter that is less than the minimum diameter that the workpiece will have after roll-shaping by a relatively small radial distance or play.

As a result it is necessary to fit the workpiece blank over and remove it from the inner roll by holding the workpiece so it is centered on the axis of the inner roll, and then moving the workpiece purely axially. If the accuracy of the axial motion is good it is possible to work with very small radial play. If there is any nonaxial vector to the transport direction the play has to be increased, with a corresponding loss in wear-resistance and so on, to allow for it.

Thus the standard such machines have complex holder arrangements that move in squared-off U-section paths each having one leg parallel to the axis of the respective shaper or a loading or unloading machine and a base extending transversely between these legs. The workpiece is thus gripped and moved first in a straight line from the loading station or a shaper, then the displacement direction is shifted 90° and the workpiece is moved along into axial line with the next station, whereupon the displacement shifts through 90° again to move it onto a shaper or into the unloading machine. Typically the workpiece is accelerated from a standstill at the start of each of the three parts of its U-shaped displacement and is decelerated at the end of each portion. Obviously, in a large-scale mass-production operation this consumes quite a bit of energy for transporting the workpieces alone, and subjects the conveyor to substantial wear and tear.

OBJECTS OF THE INVENTION

It is therefore an object of the present invention to provide an improved conveyor for a rim-shaping installation.

Another object is the provision of such a conveyor for a rim-shaping installation which overcomes the above-given disadvantages, that is which moves the workpieces smoothly while allowing the play between the inner roll and the workpieces to be reduces to very little.

SUMMARY OF THE INVENTION

The apparatus according to the invention transports a workpiece to be shaped into a wheel rim between a pair of similar rim-shaping machines having respective parallel working axes and each open to receive the workpiece only parallel to the respective axis. The apparatus has a table displaceable parallel to the axes and in a transport direction transverse thereto, at least two similar workpiece holders spaced apart in the transport direction on the table, and a guide pin projecting vertically from the table. A guide engages the pin and defines therefor a generally U-shaped transport path having two straight legs extending parallel to the axes, a straight bight extending parallel to the direction, and a pair of rounded corners connecting the respective legs to the bight. An actuator or drive displaces the pin and table connected therewith along the path and the table is maintained parallel to the direction during travel of the pin along the path.

Thus the holder table is displaced perfectly to move the workpieces axially onto and off the machines and in the transport direction between them. The two or more holders are moved perfectly synchronously, and the pin-type guidance and parallelism ensure perfect positioning at all times.

According to another feature of this invention the table is moved continuously from one end of the path to the other with a travel speed that increases and decreases sinusoidally at the start and end, respectively, of each motion along the travel path.

The guide according to this invention can be as simple as a generally U-shaped guide groove defining the path. The pin can fit in and follow this path. According to this invention the pin is displaced by an arm which extends radially from an axis lying within the U-shaped path and which is rotationally but not radially linked to the arm offset from this axis. Thus as the arm oscillates back and forth, with its speed increasing and decreasing sinusoidally only at the path ends as described above, it sweeps the pin along the groove so that the displacement speed of this pin is generally sinusoidal.

It is also possible to use an endless chain and deflector wheels forming same into the path to drive and guide the pin. Typically two sets of at least three such deflector wheels are provided, positioned to guide the chain in two such U-shaped paths. In this case the table has two such pins connected to the chain at the respective paths.

DESCRIPTION OF THE DRAWING

The above and other features and advantages will become more readily apparent from the following, reference being made to the accompanying drawing in which.

SPECIFIC DESCRIPTION

Figure 1:
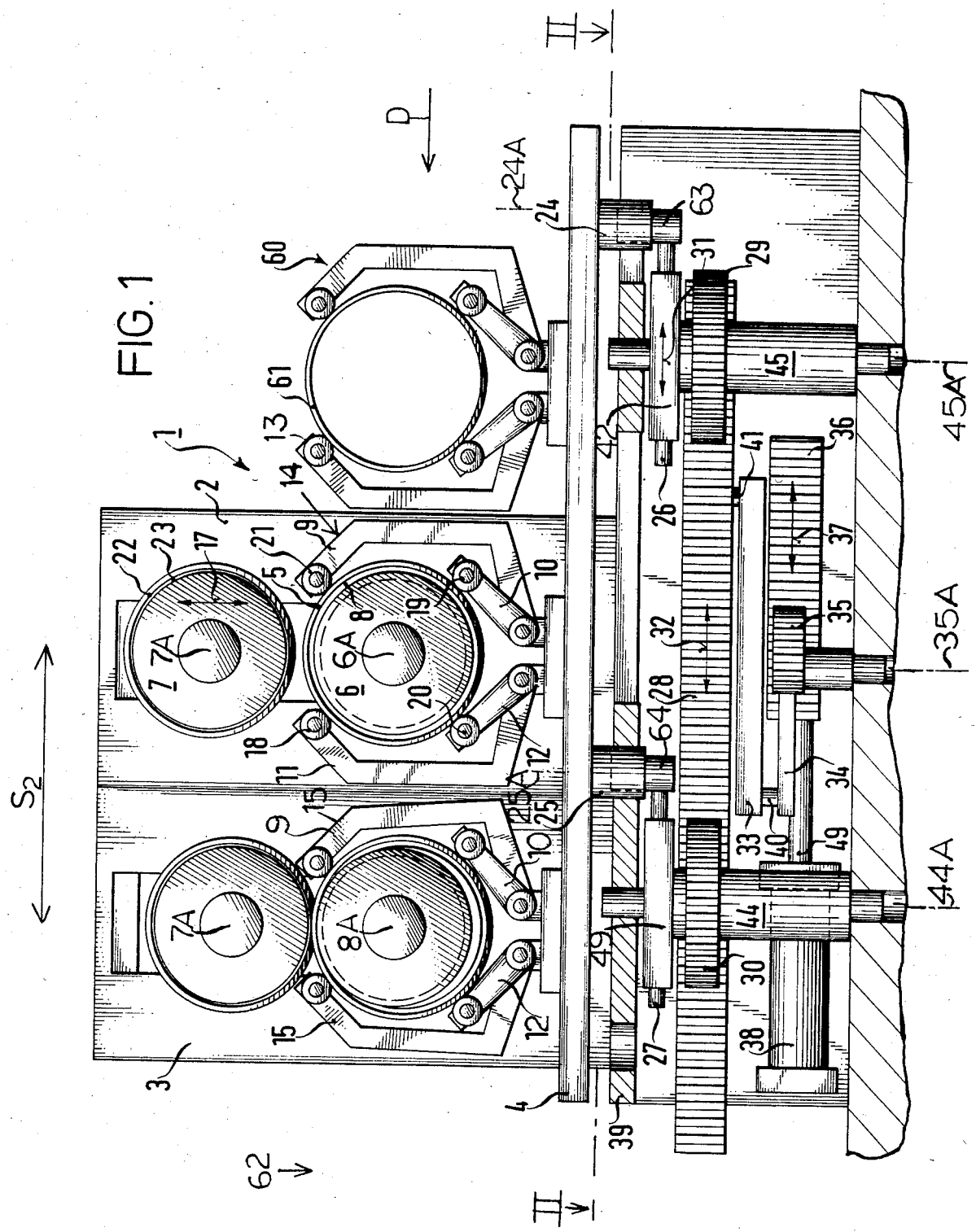
FIG. 1 is an axial end view partly in vertical section through a rim-shaping installation according to the present invention.
Figure 2:
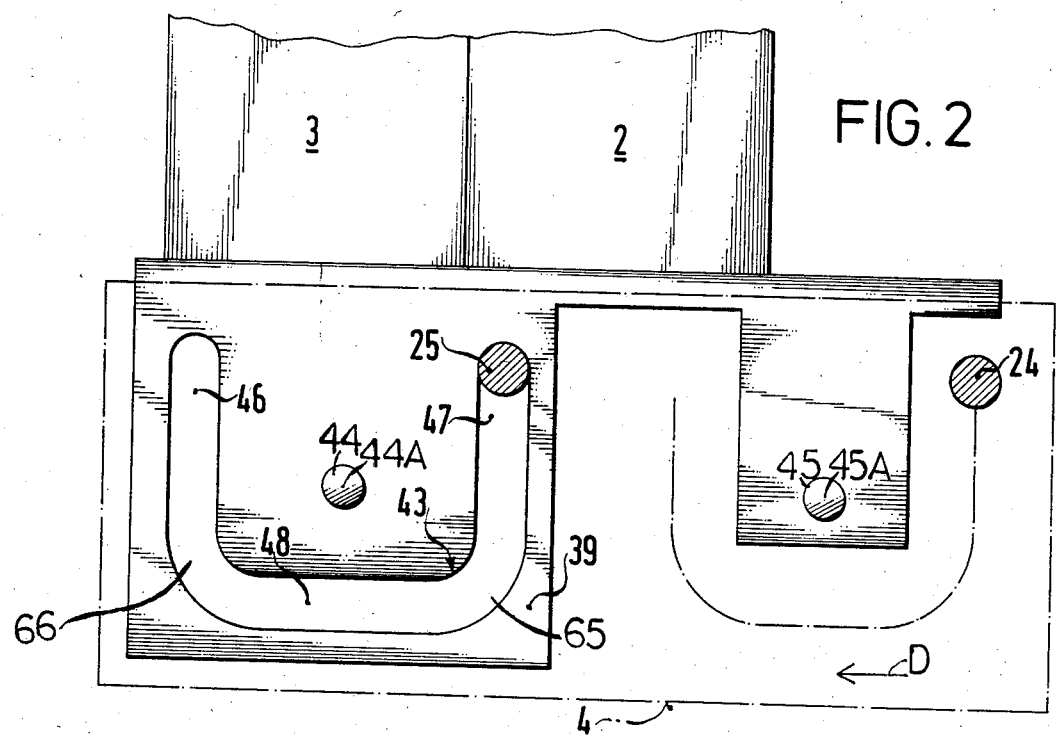
FIG. 2 is a horizontal section taken along line II—II of FIG. 1.

As seen in FIGS. 1 and 2 a roll-shaping apparatus 1 according to this invention has two substantially identical roll-shaping apparatuses 2 and 3 each having an upper and outer roll 7 and a lower or inner roll 6 rotatable about respective parallel and horizontal axes 6A and 7A. The inner roll 6 is formed on its circumference with a radially outwardly open groove and the roll 7 with complementary outwardly projecting ridges 22 and 23. The profiling of the downstream machine 3 is deeper than that of the machine 2. Appropriate motors are provided for jointly and oppositely rotating the rolls 6 and 7 of each machine and an actuator can move the outer roll radially as indicated at arrow 17 during the roll-shaping operation between the spread position of machine 2 and the closed position of machine 3.

A perfectly cylindrical ring blank 61 is fitted in a loading station 60 to an upstream holder 13 which fits it as will be described below into the upstream intermediate shaper 2 where it is turned into a partially profiled workpiece 5. An intermediate holder 14 identical to the holder 13 can remove the intermediate workpiece 5 from the machine 2 and transport it to the downstream machine 3 where it is turned into a finished workpiece 16. Subsequently a downstream holder 15 identical to the holders 13 and 14 can move the finished workpiece 16 from the machine 3 to a downstream unloading station 62.

The holders 13, 14, and 15 each are formed of four arms 9, 10, 11, and 12 pivotal about respective parallel axes and having outer ends provided with workpiece-gripping rollers 18, 19, 20, and 21. An actuator is provided to move the arms 9–12 together to grip a workpiece 5, 16, or 61, so they can be closed radially on a workpiece 61 in the loading station 60 and opened in the unloading station 62. While the workpieces 5 and 16 are being formed on the respective machines 2 and 3 the holders are released from them and moved back into the illustrated upstream position.

A horizontal support table 4 carries these three holders 13, 14, and 15 so they are spaced apart by the spacing S which is equal to the radial distance in the transport direction D between the upstream plane of the axes 6A and 7A of the machine 2 and the downstream plane of the axes 6A and 7A of the downstream machine 3 and between same and the centers of the loading and unloading stations 60 and 62. This table 4 is supported substantially only by two upright pins 24 and 25 carried on the radial outer ends of respective horizontal rods 26 and 27 extending diametrally through respective hubs 42 and 49 carried on respective shafts 44 and 45 themselves centered on upright axes 44A and 45A spaced apart in the direction D. These rods 26 and 27 extend diametrally of the respective axes A' and are diametrally slidable as indicated by arrow 31 in the respective hubs 42 and 49. Their outer ends carry respective support pins 63 and 64 that fit upwardly within the lower ends of the respective pins 26 and 27 so that these pins 63 and 64 can rotate in the pins 24 and 25 about the respective axes 24A and 25A.

The two shafts 44 and 45 carry identical gears 29 and 30 that mesh with a rack 28 that is extends in and is displaceable only in the transport direction D as indicated by arrow 32. This rack 28 in turn is pivoted at 41 on one end of a link 33 having an opposite end pivoted at 40 on the outer end of an arm 34 whose inner end is formed as a sector gear 35 rotatable about a vertical axis 35A. Another rack 36 movable only in the transport direction D as indicated by arrow 37 meshes with the sector gear 35 and is carried on the piston rod 49 of a double-acting hydraulic ram 38.

The length of the arm 34 and the positioning of the link 33 and rack 32 are such that when the piston rod 49 is fully extended the link 33 extends parallel to and underneath the rack 32 and in its fully retracted position it also is parallel to and underneath the rack 32. This drive train therefore can convert what is virtually a fixed-velocity reciprocation of the rack 36 by the cylinder 38, whose acceleration and deceleration time are so small as to be inconsequential, into a sinusoidally increasing and decreasing oscillation of the two pins 63 and 64. The gear ratios are such that this reciprocation of the rack 36 will oscillate the pins 63 and 64 through well over 180°.

FIG. 2 shows how the machine housing is provided with a guide plate 39 formed with a U-shaped guide groove 43 comprised of two straight sections 46 and 47 extending parallel to each other and to the axes 6A and 7A but spaced apart in the direction D and a straight section 48 extending in the direction D. Rounded corners 65 and 66 join the sections 46–48.

The pin 25 is snugly but slidably received in the groove 43 so it can travel therealong. The other pin 24 is not so constrained. Thus as the shaft 44 oscillates the pin 25 will be moved in the U-shaped path of the groove 43 and the pin 24 will be forced to follow it. This will cause the table 44 to move first axially of the machines 2 and 3, then in the direction D, then axially back in the opposite direction. The arrangement therefore is basically a parallelogrammatic linkage having as seen in FIG. 4 a fixed long upper link defined by the table 4 interconnecting the pivots 24 and 25, two movable short end links formed by the rod arms 26 and 27, and a long lower link formed by the machine housing interconnecting the two shafts 44 and 45. It is possible for the table to follow a U-shaped path while driven by such a parallelogrammatic linkage because the end links are of variable length.

The axial portions of the movement are so accurate that only a very limited play 8 need be provided between the workpiece 5 and the upstream machine 2 and a similar such play at the downstream machine. The lower rolls 6 can thus have relatively large diameters and be fairly wear-resistant and easy to mount. Furthermore the sinusoidal increase and decrease of oscillation speed of the shafts 44 and 45 is translated into a continuous and smooth movement of the pins 25 and 26 along with the table 4, the holders 13–15, and the workpieces 61, 5, and 16. Quick cycling time is therefore ensured with very smooth and uninterrupted motion.

Figure 3:
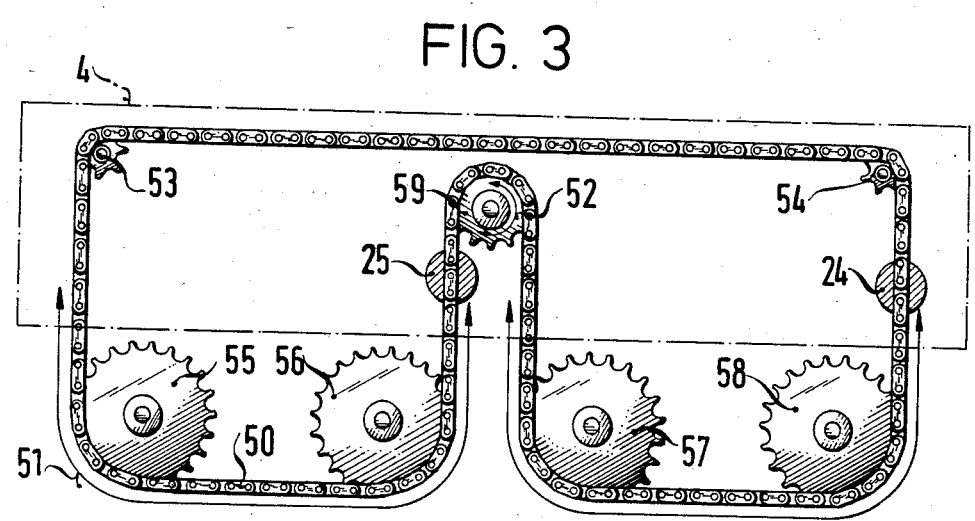
FIG. 3 is a view like FIG. 2 but of another drive system according to the invention.

In the arrangement of FIG. 3 the pins 25 are carried on an endless chain 50 spanned over two small inboard corner rollers 53 and 54, four larger outboard rollers 55, 56, 57, and 58, and a small central inboard roller 59. The roller 59 can be driven by a rack driven like the rack 28 for sinusoidally increasing, decreasing, and reversing oscillation. Thus this arrangement will displace the pins along U-section paths 51 having straight legs and bights and rounded corners like the groove 43.

I claim:

1. In combination with a pair of similar rim-shaping machines having respective parallel working axes and each open to receive a workpiece only parallel to the respective axis, a conveyor for transporting the workpiece between the machines, the conveyor comprising:
   a table displaceable parallel to the axes and in a transport direction transverse thereto;
   a pair of similar workpiece holders spaced apart in the transport direction on the table;
   a guide pin projecting vertically from the table;
   guide means engaging the pin and defining therefor a generally U-shaped transport path having two straight legs extending parallel to the axes, a straight bight extending parallel to the direction, and a pair of rounded corners connecting the respective legs to the bight;
   actuator means for displacing the pin and table connected therewith along the path; and
   means for maintaining the table parallel to the direction during travel of the pin along the path.

2. The conveyor defined in claim 1 wherein the means for maintaining includes another such pin on the table.

3. The conveyor defined in claim 1 wherein the guide means has a generally U-shaped guide groove defining the path.

4. The conveyor defined in claim 1 wherein the actuator and maintaining means include an endless chain and deflector wheels forming same into the path.

5. The conveyor defined in claim 4 wherein two sets of at least three such deflector wheels are provided, positioned to guide the chain in two such U-shaped paths, the table having two such pins connected to the chain at the respective paths.

6. The conveyor defined in claim 1 wherein the table extends horizontally and perpendicular to the pin.

7. The conveyor defined in claim 1 wherein the actuator means includes a rotatable drive element rotationally coupled to the pin.

8. The conveyor defined in claim 1 wherein the actuator means includes a crank drive for sinusoidal increase and decrease of displacement speed of the pin and table.

* * * * *